United States Patent
Zhang et al.

(10) Patent No.: US 7,666,915 B2
(45) Date of Patent: Feb. 23, 2010

(54) HIGHLY DISPERSIBLE CARBON NANOSPHERES IN A POLAR SOLVENT AND METHODS FOR MAKING SAME

(75) Inventors: Cheng Zhang, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 0 days.

(21) Appl. No.: 11/860,373

(22) Filed: Sep. 24, 2007

(65) Prior Publication Data

US 2009/0082474 A1    Mar. 26, 2009

(51) Int. Cl.
 *B01F 3/08* (2006.01)
 *C09K 3/00* (2006.01)
(52) U.S. Cl. .......................... 516/32; 428/402; 428/408
(58) Field of Classification Search ................ 516/32; 428/402, 408
See application file for complete search history.

(56) References Cited

U.S. PATENT DOCUMENTS

| | | | |
|---|---|---|---|
| 6,187,823 B1 | 2/2001 | Haddon et al. | 516/32 |
| 6,203,814 B1 | 3/2001 | Fisher et al. | 424/443 |
| 6,331,262 B1 | 12/2001 | Haddon et al. | 252/502 |
| 6,368,569 B1 | 4/2002 | Haddon et al. | 423/460 |
| 6,531,513 B2 | 3/2003 | Haddon et al. | 516/32 |
| 6,824,755 B2 | 11/2004 | Colbert et al. | 423/447.1 |
| 6,875,274 B2 | 4/2005 | Wong et al. | 117/105 |
| 6,890,676 B2 | 5/2005 | Nuber et al. | 429/33 |
| 7,125,533 B2 | 10/2006 | Khabashesku et al. | 423/447.1 |
| 2005/0229335 A1* | 10/2005 | Huang et al. | 8/405 |
| 2005/0232844 A1 | 10/2005 | Diner et al. | 423/447.2 |
| 2006/0137487 A1* | 6/2006 | McKinnon et al. | 75/252 |
| 2006/0199770 A1 | 9/2006 | Bianco et al. | 514/17 |
| 2006/0275956 A1 | 12/2006 | Konesky | 438/128 |

FOREIGN PATENT DOCUMENTS

| | | |
|---|---|---|
| JP | 2004168570 | 6/2004 |
| JP | 2004323738 | 11/2004 |
| JP | 2005194180 | 7/2005 |
| JP | 2005263607 | 9/2005 |

OTHER PUBLICATIONS

Sun et al., "Colloidal Carbon Spheres and Their Core/Shell tructures with Noble-Metal Nanoparticles", Angewandte Chemie International Edition, Wiley-VCH Verlag GmbH & Co. KGaA, 2004, vol. 43 Issue 5, pp. 597-601.*

Qiao et al., "Carbon nanospheres produced in an arc-discharge process", Carbon 44 (2006) 158-193, available online Sep. 13, 2005.*

Garrigue et al., "Top-Down Approach for the Preparation of Colloidal Carbon Nanoparticles", Chemical Materials 2004, 16, 2984-2986, available online Jul. 17, 2004.*

Chen, Y., et al., "Chemical attachment of organic functional groups to a single-walled carbon nanotube material", *Materials Research Society* (1998).

Garrigue, P., et al., "Top-Down Approach for the Preparation of Collodial Carbon Nanoparticles", *Chem. Mater.*, vol. 16, No. 16, pp. 2984-2986 (2004).

Kuznetsova, A., et al., "Oxygen-Containing Functional Groups on Single-Wall Carbon Nanotubes: NEXAFS and Vibrational Spectroscopic Studies", *J. Am. Chem. Soc.*, vol. 123, No. 43, pp. 10699-10704 (2001).

Miyata, Y., et al., "Selective Oxidation of Semiconducting Single-Wall Carbon Nanotubes by Hydrogen Peroxide", *Journal of Physical Chemistry B*, vol. 110, pp. 25-29, (2006).

Roy, B., et al., "Studies on water soluble conducting polymer Aniline initiated polymerization of $m$-aminobenzene sulfonic acid", *Synthetic Metals* 100, 233-236 (1999).

Zhao, B., et al., "Synthesis and Characterization of Water Soluble Single-Walled Carbon Nanotube Graft Copolymers", *J. Am. Chem. Soc.*, vol. 127, No. 22 (2005).

Zhao, B., et al., "Synthesis and Properties of a Water-Soluble Single-Walled Carbon Nanotube-Poly($m$-aminobenzene sulfonic acid) Graft Copolymer", *Advanced Functional Materials*, vol. 14, No. 1 (2004).

* cited by examiner

*Primary Examiner*—Ling-Siu Choi
*Assistant Examiner*—Chun-Cheng Wang
(74) *Attorney, Agent, or Firm*—Workman Nydegger (57) ABSTRACT

The particle sizes of agglomerates of carbon nanospheres are reduced by dispersing the carbon nanospheres in a polar solvent. The carbon nanospheres are multi-walled, hollow, graphitic structures with an average diameter in a range from about 10 nm to about 200 nm, more preferably about 20 nm to about 100 nm. Spectral data shows that prior to being dispersed, the carbon nanospheres are agglomerated into clusters that range in size from 500 nm to 5 microns. The clusters of nanospheres are reduced in size by dispersing the carbon nanospheres in the polar solvent (e.g., water) using a surface modifying agent (e.g., glucose) and ultrasonication. The combination of polar solvent, surface modifying agent, and ultrasonication breaks up and disperses agglomerates of carbon nanospheres.

19 Claims, 6 Drawing Sheets

HIGHLY DISPERSIBLE CARBON NANOSPHERES IN A POLAR SOLVENT AND METHODS FOR MAKING SAME

BACKGROUND OF THE INVENTION

1. The Field of the Invention

The present invention relates generally to the manufacture of carbon nanomaterials. More particularly, the present invention relates to methods for manufacturing carbon nanospheres that are highly dispersible in a polar solvent.

2. The Related Technology

Carbon materials have been used in various fields for a variety of applications. Examples of current uses of carbon materials include pigments, fillers, catalyst supports, and fuel cell electrodes, among others. Pyrolysis of organic compounds is a known method for preparing carbon materials. For example, carbon materials can be produced by pyrolyzing resorcinol-formaldehyde gel at temperatures above 600° C.

Most carbon materials obtained by pyrolysis of organic compounds at temperatures between 600-1400° C. tend to be amorphous or have a disordered structure. Obtaining highly crystalline or graphitic carbon materials can be very advantageous because of the unique properties exhibited by graphite. For example, graphitic materials can be thermally and electrically conductive.

Recently, methods have been developed to make highly ordered graphitic structures such as carbon nanotubes. One way to make graphitic nanostructures is to carbonize a carbon precursor (carbon gas or carbon resin) in the presence of a metal catalyst. The catalyst is typically a salt of iron, nickel, or cobalt that is mixed with carbon precursor and then heated. During the carbonization process, the carbon nanostructure grows from or around the catalytic metal to yield a well ordered structure. The metal catalyst can be removed from the carbon nanomaterial by treating with strong acids. Amorphous carbon can be removed using an oxidizing agent such as potassium permanganate.

BRIEF SUMMARY OF THE INVENTION

The present invention relates to methods for reducing the particle size of agglomerates of carbon nanospheres by dispersing the carbon nanospheres in a polar solvent. The carbon nanospheres are multi-walled, hollow, graphitic structures with an average diameter in a range from about 10 nm to about 200 nm, more preferably about 20 nm to about 100 nm. Spectral data shows that prior to being dispersed, the carbon nanospheres are agglomerated into clusters that range in size from 500 nm to 5 microns. In the method of the present invention, the clusters of nanospheres are reduced in size by dispersing the carbon nanospheres in the polar solvent (e.g., water) using a surface modifying agent (e.g., glucose) and ultrasonication. The combination of the polar solvent, surface modifying agent, and ultrasonication is able to break up and disperse agglomerates of carbon nanospheres. Unexpectedly, agglomerates of carbon nanospheres with an average particle size of 500 nm to 5 microns can be dispersed using the inventive methods to yield nanospheres and/or agglomerates of nanospheres with an average particle size of less than about 300 nm, more preferably less than about 200 nm, and most preferably less than about 150 nm as measured using light scattering.

The combination of the polar solvent, surface modifying agent, and ultrasonication can yield a very stable dispersion of carbon nanospheres within the polar solvent. Carbon nanospheres dispersed using the method of the invention can be stable in the polar solvent for hours, days, months, or even longer. Surprisingly, the particle size distribution can be very narrow. In contrast to just sonicating in water, the combination of ultrasonicating the carbon nanospheres in a polar solvent in the presence of the surface modifying agent can yield a carbon nanomaterial with a surprisingly narrow particle size distribution as measured using dynamic light scattering. In one embodiment, at least 80% of the carbon nanomaterial has an average particle size of less than 500 nm, more preferably less than 300 nm, and most less than 200 nm. More preferably at least 90% of the carbon nanomaterial has an average particle size within one or more of the foregoing particle size ranges.

The small particle size, narrow particle size distribution, and stability of the suspended carbon nanospheres in the solvent is particularly advantageous for using the dispersed carbon nanomaterials in various applications including, but not limited to, fillers, pigments, supercapacitors, and high-performance electrodes.

The surface modifying agent used in the invention is an organic molecule that is soluble in a polar solvent and has one or more functional groups that can bond with the carbon nanospheres. The surface modifying agent can be a surfactant, an organic acid, a carbohydrate, an amino acid, and the like. Examples of suitable functional groups include carboxyl, amine, sulfonate, and/or hydroxyl groups. Specific examples of compounds that can be used as a surface modifying agent include glucose, glycolic acid, glycine, ascorbic acid, sodium dodecyl benzene sulfonate, phosphotungstic acid, and trifluoroacetic acid. In one embodiment, the surface modifying agent is a biocompatible organic molecule such as, but not limited to, glucose, glycolic acid, glycine, or ascorbic acid. The use of a biocompatible surface modifying agent, in combination with a desired particle size distribution, is particularly advantageous for using the carbon nanospheres in biomedical applications.

In one embodiment the carbon nanospheres include oxygen-containing surface functional groups that provide a bonding site for the surface modifying agent. The oxygen-containing surface functional groups can be introduced during purification of the carbon nanospheres and/or using a severe oxidizing agent. It has been found that oxygen-containing functional groups can be highly beneficial for dispersing the carbon nanospheres according to the invention when the concentration of surface oxygen is at least about 2 wt % surface oxygen as measured using XPS, more preferably at least about 5 wt %, even more preferably at least about 10 wt %, and most preferably at least about 15 wt %. The carbon nanospheres of the present invention also include an irregular surface. The irregular surface can be beneficial for introducing surface functional groups and can facilitate dispersing of the carbon nanospheres in a polar solvent.

The surface modifying agent is dissolved in a polar solvent. Examples of suitable polar solvents include, but are not limited to, water, alcohols, tetrahydrofuran (THF), and the like. Surprisingly, it has been found that water is a particularly good solvent for dispersing the carbon nanospheres. Aqueous solvents are preferred for their biocompatibility and usefulness when blending the dispersed carbon nanomaterials into hydrophilic materials.

To disperse the carbon nanospheres, the carbon nanospheres are mixed with a solution of the solvent and surface modifying agent and then ultrasonicated. The chemical adsorption and/or bonding of the surface modifying agent during ultrasonication breaks up agglomerates of carbon nanospheres and disperses the carbon nanospheres and/or smaller agglomerates of carbon nanospheres into the polar solvent.

Experimental data shows that ultrasonication treatment, in combination with the surface modifying agent and polar solvent is much more effective than ultrasonication alone or sequential treatments.

The term "ultrasonication" is well known in the art and refers to a process in which ultrasonic sound waves are input into a vessel. In this case, the vessel will contain the polar solvent, surface modifying agent, carbon nanospheres and/or agglomerates, and optional components.

The carbon nanospheres dispersed using the methods of the invention have been found to retain the beneficial structure, shape, and graphitic nature of the undispersed carbon nanospheres. The dispersed carbon nanospheres are highly graphitic, which is advantageous for providing strength, electrical conductivity, thermal conductivity and other desired properties.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

I. Introduction and Definitions

The present invention relates to carbon nanospheres dispersed in a polar solvent using ultrasonication and an organic surface modifying agent. The dispersion of the carbon nanospheres reduces the average particle size as measured using dynamic light scattering. Using the methods of the invention, the average particle size is reduced from greater than about 500 nm to less than about 300 nm, more preferably less than about 200 nm. The dispersed carbon nanospheres have unique properties due to their size and dispersion in the polar solvent.

For purposes of the present invention, the term average particle size of the carbon nanomaterial is determined using dynamic light scattering and corresponds to a peak of the light scattering spectral data. Where more than 1 significant peak is observed, the average diameter shall mean the weighted average according to the % intensity for the two or more peaks, unless otherwise indicated.

II. Components Used to Manufacture Dispersed Carbon Nanospheres

A. Carbon Nanomaterials Containing Carbon Nanospheres

The carbon nanospheres used in the method of the invention are multi-walled, hollow, graphitic structures with an average diameter in a range from about 10 nm to about 200 nm, preferably about 20 nm to about 100 mm. The multiple walls form a closed structure with a hollow center.

Typically, the individual carbon nanospheres have an aspect ratio of less than about 3:1 (i.e., width to height is less than 3:1), preferably less than about 2:1, more preferably less than about 1.75:1, and most preferably less than about 1.5:1. In one embodiment, the carbon nanospheres have an irregular surface. The irregular surface has defects that cause the nanospheres to have a shape that is not perfectly spherical. The graphitic defects are believed to contribute in part to the dispersibility of the carbon nanospheres in the polar solvent. The carbon nanospheres are highly graphitic, which gives the carbon nanomaterial excellent electrical and thermal conductivity.

Typically, the thickness of the carbon nanosphere wall is between about 1 nm and 20 nm. However, thicker and thinner walls can be made if desired. The thickness of the nanostructure wall is measured from the inside diameter of the wall to the outside diameter of the wall. In one embodiment, the carbon nanostructures have walls of between about 2 and about 100 graphite layers, preferably between about 5 and 50 graphite layers, and more preferably between about 5 and 20 graphite layers. The number of graphitic layers can be varied by varying the thickness of the carbon nanostructure wall as discussed below in relation to methods for manufacturing carbon nanospheres. The advantage of making a thicker wall is greater structural integrity. The advantage of making a thinner wall is greater surface area and nanoporosity.

The spheroidal shape and multi-walled nature of the carbon nanospheres also provides strength that makes the carbon nanospheres less likely to be crushed or broken into undesired shapes or non-shaped graphite. Maintaining the shape of the carbon nanospheres can be important for maintaining performance characteristics over time. The multi-walled nature of the nanospheres also allows the surface to be functionalized while maintaining the beneficial thermal and electrical conductivity via the interior graphite layers. The hollow center gives the nanomaterial a relatively lower density and higher porosity. In one embodiment, the surface area is in a range from about 100 $m^2/g$ to about 400 $m^2/g$, preferably about 125 $m^2/g$ to about 300 $m^2/g$, and more preferably about 150 $m^2/g$ to about 250 $m^2/g$.

The carbon nanomaterials are, prior to dispersion, typically provided as agglomerated particles of carbon nanospheres.

Figure 1:
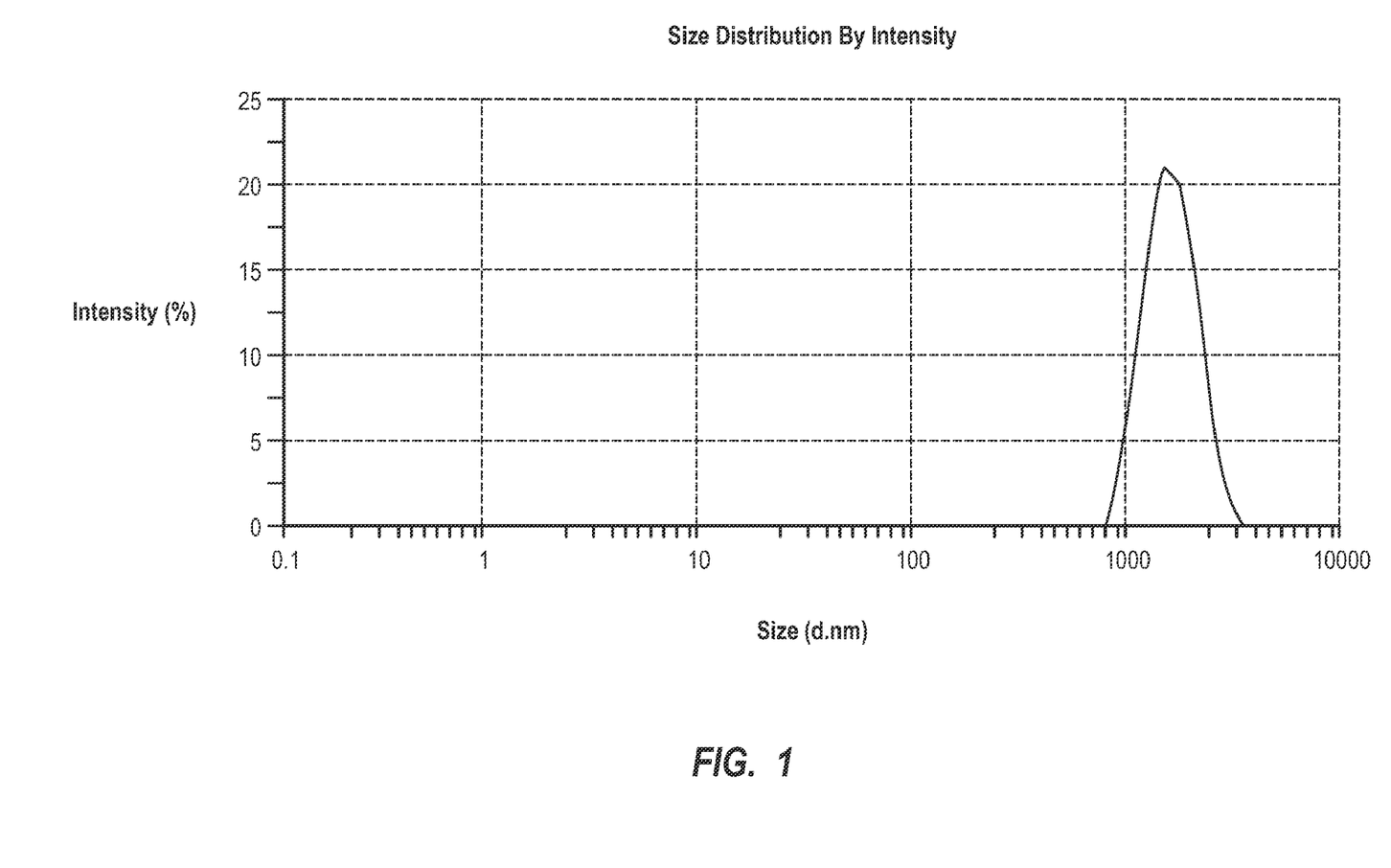
FIG. 1 is a dynamic light scattering spectrum of carbon nanospheres prior to being dispersed in a polar solvent according to the invention.

While the individual carbon nanospheres have a diameter of less than 500 nm, the carbon nanospheres tend to agglomerate to form clusters (i.e., particles of agglomerated nanospheres) with average diameters greater than 500 nm. Spectral data shows that prior to being dispersed, the carbon nanospheres are agglomerated into clusters that range in size from 500 nm to 5 microns. FIG. 1 is a graph showing the size distribution of a carbon nanomaterial used in one embodiment of the invention, prior to the carbon nanomaterial being dispersed. As seen in FIG. 1, the average particle diameter is about 1.4 microns as measured using dynamic light scattering.

Figure 2A:
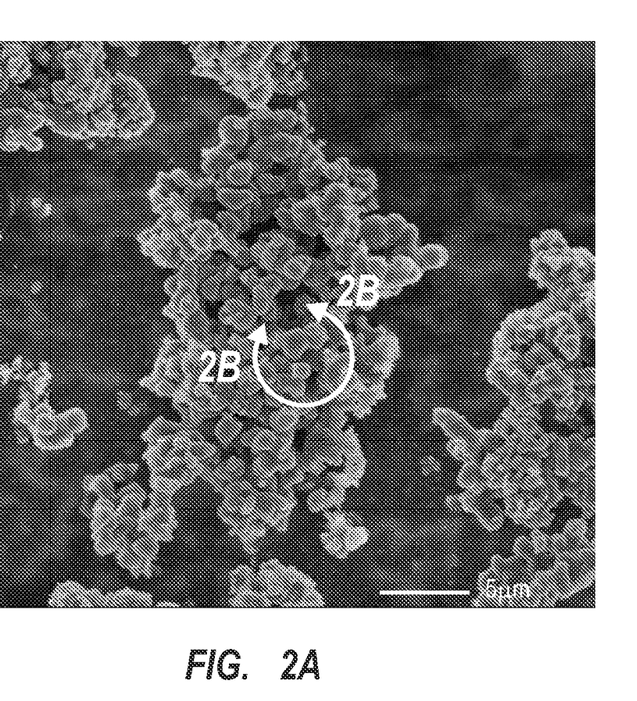
FIG. 2A is a high resolution SEM image of carbon nanospheres agglomerated into a plurality of nanosphere clusters.
Figure 2B:
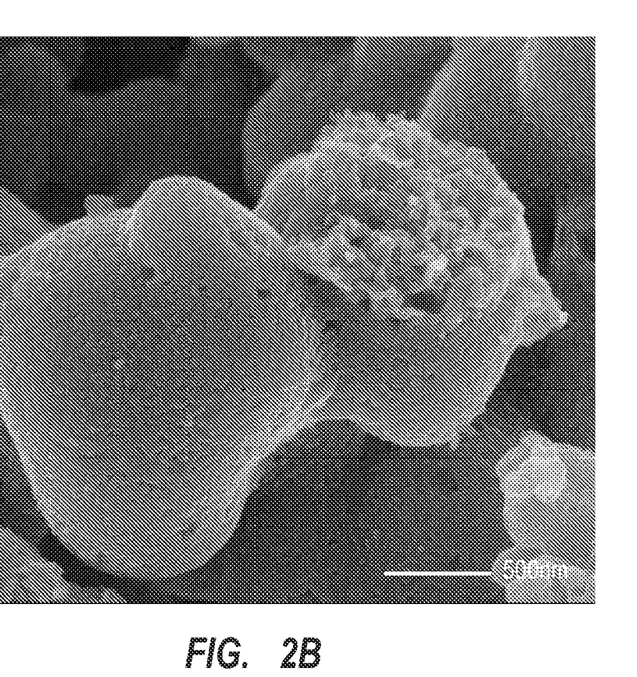
FIG. 2B is a high resolution SEM image showing a closer image of individual clusters of carbon nanospheres of FIG. 2A and showing one cluster that has been broken open to reveal the plurality of carbon nanospheres that make up the cluster.
Figure 2C:
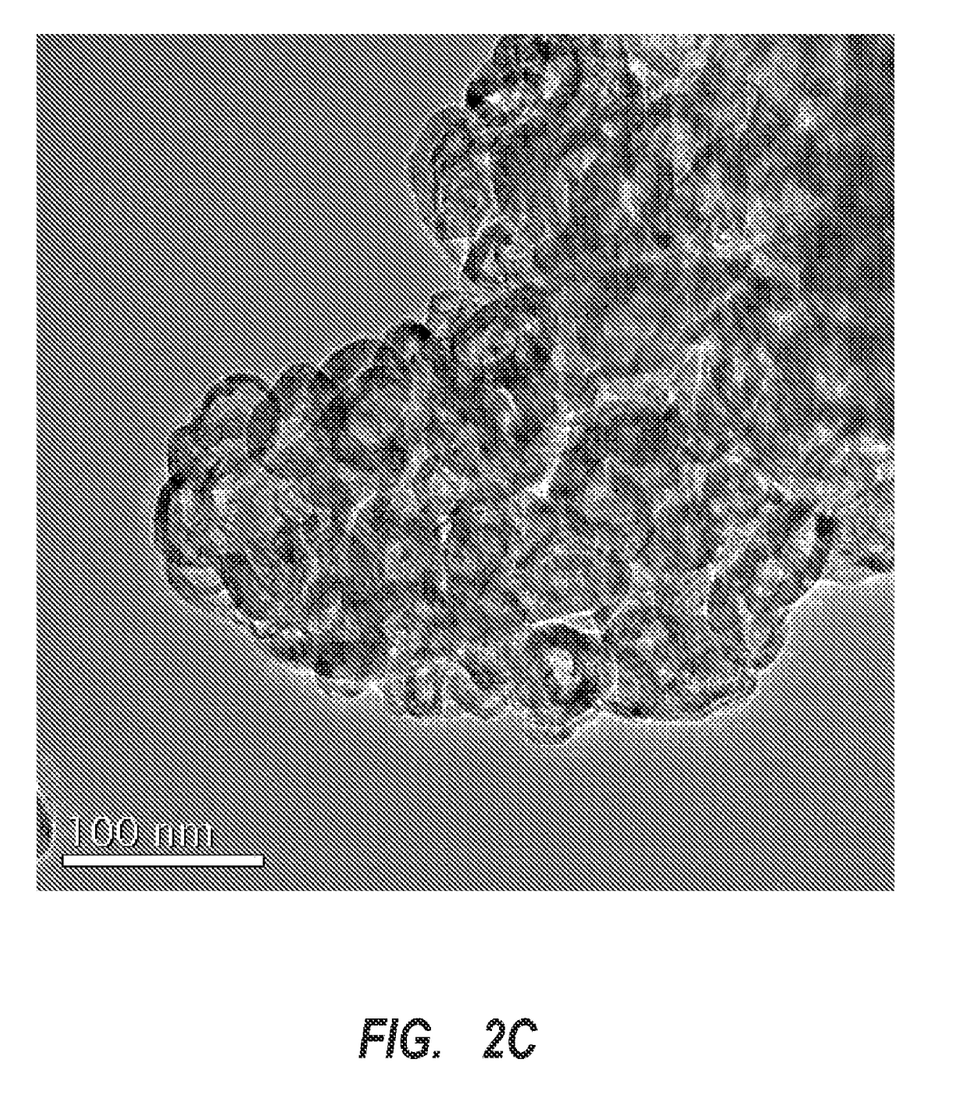
FIG. 2C is a high resolution TEM image of the carbon nanomaterial of FIG. 2A showing a plurality of carbon nanospheres agglomerated together and revealing the multi-walled and hollow nature of the carbon nanospheres that form the cluster.

FIGS. 2A and 2B are SEM images of a cluster of nanospheres. In FIGS. 2A and 2C, the images reveal that, at least in some embodiments, the carbon nanospheres are clustered together to form a "grape-like" secondary structure. FIG. 2B is a close-up of some of the clusters, with one cluster broken open thereby exposing a plurality of carbon nanospheres. The TEM image in FIG. 2C further shows that the clusters are made up of a plurality of smaller nanospheres. The SEM and TEM images reveal that the nanostructures are hollow and generally spheroidal.

In one embodiment, the carbon nanospheres can be one of several components of a carbon nanomaterial. Higher percentages of carbon nanospheres are typically preferred such that the carbon nanomaterial can benefit from the unique properties of the carbon nanospheres. In one embodiment, the nanospheres are at least about 10 wt % of the carbon nanomaterial, preferably at least about 50 wt %, more preferably about 75 wt %, even more preferably at least about 90 wt %, and most preferably at least about 98 wt %. The portion of the carbon nanomaterial that is not carbon nanospheres is preferably a graphitic material such as graphite sheets or other graphitic nanostructures. The carbon nanomaterials can include non-graphitic amorphous carbon. However, it is typically advantageous to minimize the percentage of non-graphitic amorphous carbon (e.g., by removing it during purification and/or by converting non-graphitic amorphous carbon to graphite during additional heat treatment steps).

The carbon nanospheres typically include oxygen-containing surface functional groups that provide a bonding site for the surface modifying agent. It has been found that oxygen-containing functional groups can be highly beneficial for dispersing the carbon nanospheres according to the invention when the concentration of surface oxygen is at least about 2 wt % surface oxygen as measured using XPS, preferably at least about 5 wt %, more preferably at least about 10 wt %, and most preferably at least about 15 wt % of surface oxygen as measured using XPS.

The carbon nanospheres can be treated to introduce oxygen-containing functional groups on the surface. Examples of suitable oxidizing agents include sulfuric acid, $KMnO_4$, $H_2O_2$, 5M or greater $HNO_3$, and aqua regia. The foregoing oxidizing agents tend to introduce less than about 9 wt % oxygen to the surface of the carbon nanospheres as measured using XPS. If desired, higher wt % oxygen-containing functional groups can be achieved using severe oxidizing agents. Introducing oxygen-containing functional groups can be beneficial to provide desired quantities of locations where the surface modifying agent can bond to the carbon nanospheres. Examples of suitable severe oxidizing agents include (i) mixtures of nitric acid and sulfuric acid, (ii) solutions of hydrogen peroxide, and (iii) mixtures of sulfuric acid and hydrogen peroxide. Specific examples of suitable concentrations for severe oxidation include, but are not limited to, a mixture of sulfuric acid and nitric acid (70%) in a 3:1 v/v ratio; a solution of 30% hydrogen peroxide; or a mixture of sulfuric acid (98%) and hydrogen peroxide (30%) in a 4:1 v/v ratio.

B. Surface Modifying Agents

The surface modifying agent used in the invention is an organic molecule that is soluble in a polar solvent and has one or more functional groups that can bond with the carbon nanospheres. The surface modifying agent can be a surfactant, an organic acid, a carbohydrate, an amino acid, and the like. Examples of suitable functional groups for bonding with the surface of the carbon nanospheres include carboxyl, amine, sulfonate, and/or hydroxyl groups. In some embodiments, the functional groups are selected to bond with oxygen-containing functional groups on the surface of the carbon nanospheres (e.g., hydroxyl or carboxyl groups). Specific examples of compounds that can be used as a surface modifying agent include glucose, glycolic acid, glycine, ascorbic acid, sodium dodecyl benzene sulfonate, phosphotungstic acid, trifluoroacetic acid, and the like.

C. Polar Solvents

The solvent can be any polar solvent that can dissolve the surface modifying agent and maintain a suspension of carbon nanospheres when the carbon nanospheres are coated with the surface modifying agent. Examples of suitable polar solvents include, but are not limited to, water, alcohols, tetrahydrofuran (THF), and the like. Surprisingly, it has been found that water is a particularly good solvent for dispersing the carbon nanospheres. Aqueous solvents are preferred for their usefulness in biological applications and for blending the dispersed carbon nanomaterials into hydrophilic materials to make a composite.

III. Methods for Dispersing Carbon Nanospheres

In the method of the present invention, the clusters of nanospheres are reduced in size by dispersing the carbon nanospheres in the polar solvent (e.g., water) using a surface modifying agent (e.g., glucose) and ultrasonication.

The method generally includes selecting a surface modifying agent that can react with oxygen-containing functional groups on the surface of the carbon nanospheres and selecting a polar solvent that can dissolve the surface modifying agent. To disperse the carbon nanospheres, a mixture of the polar solvent, surface modifying agent, and the carbon nanospheres is formed. The solvent, surface modifying agent, and nanospheres can be mixed together in any order. In one embodiment, the concentration of the surface modifying agent in the solvent is in a range from about 0.5 wt % to about 20 wt %, more preferably in a range from about 5 wt % to about 10 wt %. The carbon nanomaterial containing the carbon nanospheres is typically included in the mixture in a concentration in a range from about 0.1 to about 20, more preferably from about 1 wt % to about 10 wt %.

The carbon nanospheres are dispersed into the solvent using ultrasonication. Ultrasonication can be carried out using any suitable technique, such as an ultrasonic bath, to vibrate the carbon nanospheres at ultrasonic frequencies. An example of an ultrasonication device suitable for use in dispersing carbon nanospheres is CREST ULTRASONICS TRU-SWEEP™ (68 kHz frequencies and 500 watt).

Ultrasonication is typically carried out for at least 30 min, preferably at least about 1 hour, and more preferably at least about 2 hours. Examples of suitable ranges of time for carrying out ultrasonication of the mixture include about 30 minutes to about 6 hours and preferably about 1 hour to about 3 hours. The ultrasonication step can be carried out at room temperature or other suitable temperatures.

The combination of the polar solvent, surface modifying agent, and ultrasonication is able to break up and disperse agglomerates of carbon nanospheres. Unexpectedly, agglomerates of carbon nanospheres with an average particle size of 500 nm to 5 microns can be dispersed using the inventive methods to yield nanospheres and/or agglomerates of nanospheres with an average particle size of less than about 300 mm, more preferably less than about 200 nm, and most preferably less than about 150 nm as measured using dynamic light scattering.

Figure 3:
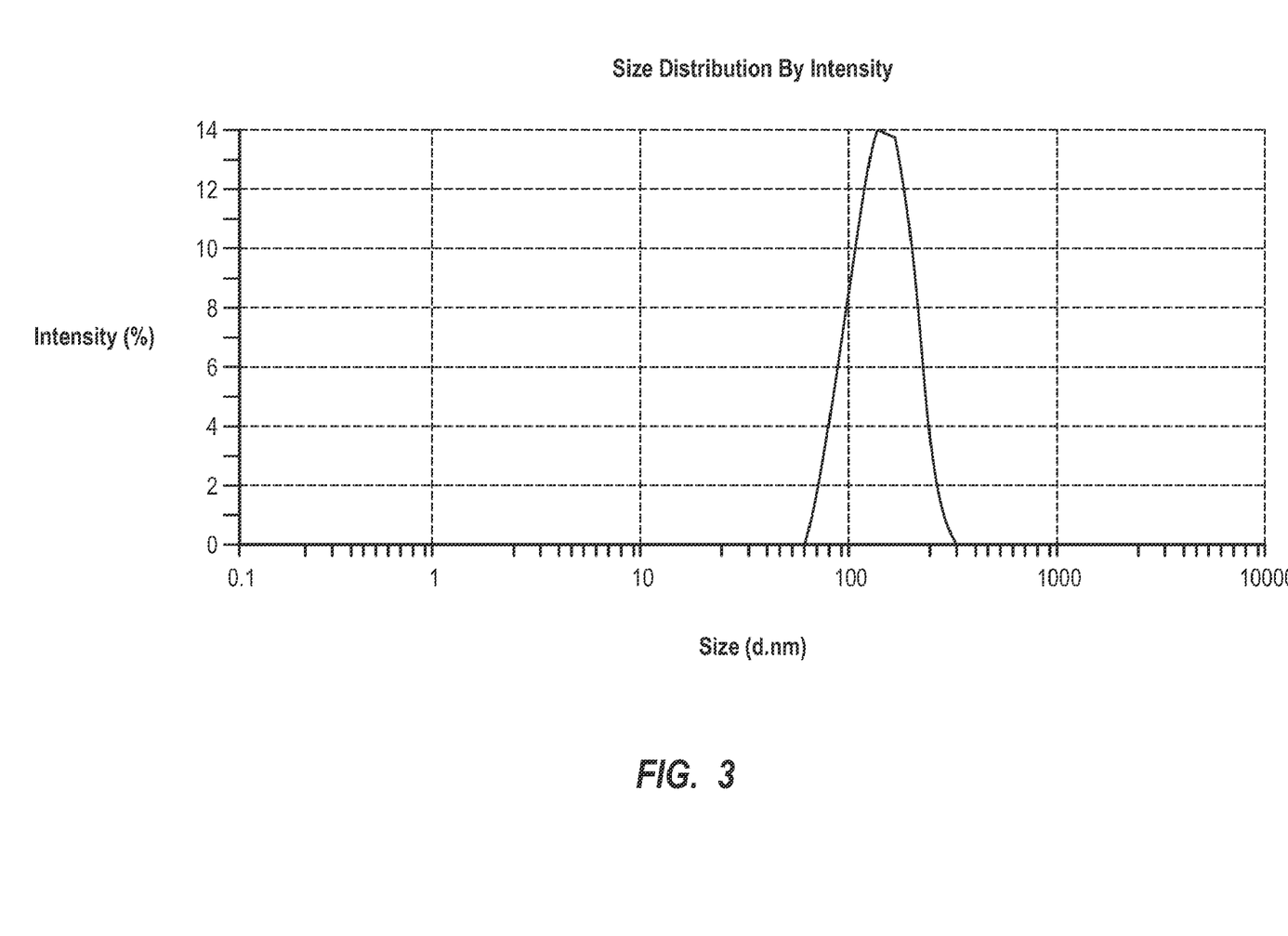
FIG. 3 is a dynamic light scattering spectrum of carbon nanospheres dispersed according to the present invention.
Figure 4A:
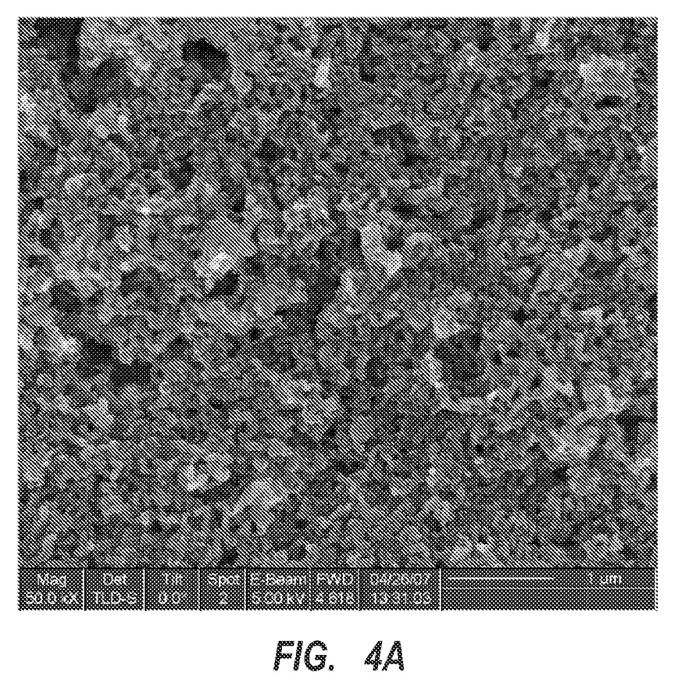
FIG. 4A is an SEM image of the carbon nanospheres of FIG. 2A after being dispersed in a polar solvent according to one embodiment of the invention.
Figure 4B:
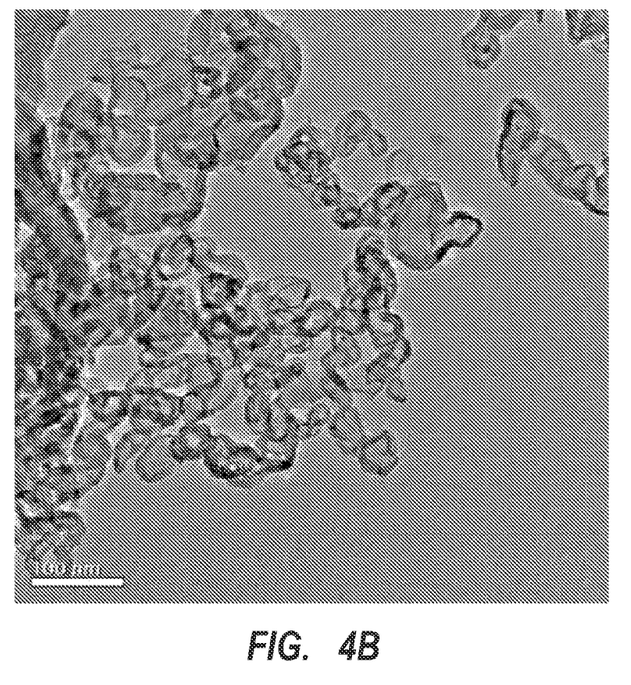
FIG. 4B is a TEM image of the carbon nanospheres of FIG. 4A.

Dynamic light scattering data of the dispersed carbon nanospheres of the invention illustrate the significant reduction in average particle size achieved using the method of the present invention. FIG. 3 is a graph showing the dynamic light scattering of a carbon nanomaterial dispersed using the method of the present invention, which is described in detail below in Example 2. As shown in FIG. 3, in one embodiment, the method of the invention yielded dispersed carbon nanospheres with an average particle size of 147 nm. FIGS. 4A and 4B are SEM and TEM images, respectively, of carbon nanospheres after they have been dispersed according to the present invention. FIGS. 4A and 4B can be compared to FIGS. 2B and 2C, which show the carbon nanomaterials of FIGS. 4A and 4B prior to being dispersed according to the invention. This comparison of the Figures reveals the significant improvement in dispersion achieved using the methods of the present invention.

In addition to the improved dispersion, the dispersed carbon nanospheres also tend to have a relatively narrow distribution of particle sizes. In one embodiment, the width of the particle size distribution is in a range from about 10 nm to about 300 nm.

Carbon nanospheres dispersed according to the methods of the present invention advantageously retain their beneficial properties such as multi-walled, hollow, closed structure, graphitic nature, and original size and shape of the primary structures. The carbon nanospheres shown in the TEM image of FIG. 4B reveal highly dispersed carbon nanospheres with similar primary structure as the carbon nanospheres in the clusters of FIG. 2C prior to dispersion.

The carbon nanospheres dispersed according to the present invention have been found to be surprisingly stable in the polar solvent. Carbon nanospheres manufactured according to the present invention have been observed to be stable for months at room temperature. In one embodiment of the invention, the carbon nanospheres are stable for at least about one hour, more preferably at least about one day, and most preferably at least about one month.

The dispersed carbon nanospheres are particularly advantageous for making composites. Because the carbon nanospheres are readily dispersible, the carbon nanospheres can be mixed with other materials to form composites. The composites of the invention can benefit from the narrow particle size distribution and unique properties of the carbon nanospheres of the invention, including strength, electrical and thermal conductivity, porosity, surface area, etc.

IV. Manufacturing Carbon Nanospheres

The carbon nanospheres used in the methods of the present invention can be manufactured using any technique that provides carbon nanospheres having the desired properties described above. In one embodiment, the method for manufacturing carbon nanospheres generally includes (1) forming a precursor mixture that includes a carbon precursor and a plurality of catalytic templating particles, (2) carbonizing the precursor mixture to form an intermediate carbon material including carbon nanostructures, amorphous carbon, and catalytic metal, and (3) purifying the intermediate carbon material by removing at least a portion of the amorphous carbon and optionally at least a portion of the catalytic metal. The following components can be used to carry out the above mentioned steps for manufacturing carbon nanospheres according to the present invention.

A. Components Used to Make Carbon Nanospheres (1) Carbon Precursor

Any type of carbon material can be used as the carbon precursor of the present invention so long as it can disperse the templating particles and carbonize around the templating particles upon heat treating. Suitable compounds include single and multi-ring aromatic compounds such as benzene and naphthalene derivatives that have polymerizable functional groups. Also included are ring compounds that can form single and multi-ring aromatic compounds upon heating. Functional groups that can participate in polymerization include COOH, C=O, OH, C=C, $SO_3$, $NH_2$, SOH, N=C=O, and the like.

The carbon precursor can be a single type of molecule (e.g., a compound that can polymerize with itself), or the carbon precursor can be a combination of two or more different compounds that co-polymerize together. For example, in one embodiment, the carbon precursor can be a resorcinol-formaldehyde gel. In this two compound embodiment, the formaldehyde acts as a cross-linking agent between resorcinol molecules by polymerizing with the hydroxyl groups of the resorcinol molecules.

Other examples of suitable carbon precursors include resorcinol, phenol resin, melamine-formaldehyde gel, poly (furfuryl alcohol), poly(acrylonitrile), sucrose, petroleum pitch, and the like. Other polymerizable benzenes, quinones, and similar compounds can also be used as carbon precursors and are known to those skilled in the art.

In one embodiment, the carbon precursor is a hydrothermally polymerizable organic compound. Suitable organic compounds of this type include citric acid, acrylic acid, benzoic acid, acrylic ester, butadiene, styrene, cinnamic acid, and the like.

(2) Catalytic Templating Nanoparticles

The catalytic templating nanoparticles are used as a template for making the nanostructures. When mixed with the carbon precursor, the templating nanoparticles provide a nucleation site where carbonization and/or polymerization can begin or be enhanced. Because the templating nanoparticles are made from catalytic atoms, the templating particles can advantageously serve as both a nucleating site and as a catalyst for carbonization and/or polymerization.

The catalytic templating particles can be formed in more than one way. As described below, in one embodiment, the templating particles are formed from metal salts that agglomerate to form particles. Optionally, the catalyst atoms can be complexed with a dispersing agent to control formation of the particles. Templating nanoparticles formed using a dispersing agent tend to be more uniform in size and shape than templating particles formed without a dispersing agent.

(i) Catalyst Atoms

The catalyst atom used to form the templating nanoparticles can be any material that can cause or promote carbonization and/or polymerization of the carbon precursor. In a preferred embodiment, the catalyst is a transition metal catalyst including but not limited to iron, cobalt, or nickel. These transition metal catalysts are particularly useful for catalyzing many of the polymerization and/or carbonization reactions involving the carbon precursors described above.

(ii) Dispersing Agents

Optionally, a dispersing agent can be complexed with the catalyst atoms to control formation of the templating nanoparticles. The dispersing agent is selected to promote the formation of nanocatalyst particles that have a desired stability, size and/or uniformity. Dispersing agents within the scope of the invention include a variety of small organic molecules, polymers and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding.

To provide the bonding between the dispersing agent and the catalyst atoms, the dispersing agent includes one or more appropriate functional groups. Preferred dispersing agents include functional groups which have either a charge or one or more lone pairs of electrons that can be used to complex a metal catalyst atom, or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In one embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, or an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. In a preferred embodiment, the molar ratio of dispersing agent functional groups to catalyst atoms is preferably in a range of about 0.01:1 to about 100:1, more preferably in a range of about 0.05:1 to about 50:1, and most preferably in a range of about 0.1:1 to 20:1.

The dispersing agents of the present invention allow for the formation of very small and uniform nanoparticles. In general, the nanocatalyst particles formed in the presence of the dispersing agent are less than 1 micron in size. Preferably the nanoparticles are less than about 100 nm, more preferably less than about 50 nm and most preferably less than about 20 nm.

During pyrolysis of the carbon precursor, the dispersing agent can inhibit agglomeration and deactivation of the catalyst particles. This ability to inhibit deactivation can increase the temperature at which the nanocatalysts can perform and/or increase the useful life of the nanocatalyst in the extreme conditions of pyrolysis. Even if including the dispersing agent only preserves catalytic activity for a few additional milliseconds, or even microseconds, the increased duration of the nanocatalyst can be very beneficial at high temperatures, given the dynamics of carbonization.

(iii) Solvents and Other Additives

A solvent can optionally be used to prepare the catalyst atoms for mixing with the dispersing agent and/or the carbon precursor. The liquid medium in which the catalytic templating nanoparticles are prepared may contain various solvents, including water and organic solvents. Solvents participate in particle formation by providing a liquid medium for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The catalyst composition can also include additives to assist in the formation of the nanocatalyst particles. For example, mineral acids and basic compounds can be added, preferably in small quantities (e.g., less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easy separated from the final iron catalyst solution or suspension using simple techniques such as centrifugation and filtration.

(3) Reagents for Purifying Intermediate Carbon Materials

Various reagents can be used to remove amorphous carbon and/or the catalytic metals from the carbon nanostructures, thereby purifying the intermediate material. The purification can be carried out using any reagent or combination of reagents capable of selectively removing amorphous carbon (or optionally catalytic metal) while leaving graphitic material.

Reagents for removing amorphous carbon include oxidizing acids, oxidizing agents, and mixtures of these. An example of a mixture suitable for removing amorphous carbon includes sulfuric acid, $KMnO_4$, $H_2O_2$, 5M or greater $HNO_3$, and aqua regia.

The catalytic metal can be removed using any reagent that can selectively dissolve the particular metal used as catalyst without significantly destroying the carbon nanostructures, which are graphitic. Nitric acid is an example of a reagent suitable for dissolving many base transition metals such as, but not limited to, iron, cobalt, and nickel. Other examples of suitable reagents include hydrogen fluoride, hydrochloric acid, and sodium hydroxide. If desired, additional heat treatment steps can be carried out on the intermediate carbon to convert all or some of the remaining amorphous carbon to graphite. The subsequent heat treatment can be carried out at a temperature above about 250° C., more preferably above about 500° C.

B. Process For Making Carbon Nanospheres

The carbon nanostructures of the present invention can be manufactured using all or a portion of the following steps: (i) forming a precursor mixture that includes a carbon precursor and a plurality of templating nanoparticles, (ii) allowing or causing the carbon precursor to polymerize around the catalytic templating nanoparticles, (iii) carbonizing the precursor mixture to form an intermediate carbon material that includes a plurality of nanostructures (e.g., carbon nanospheres), amorphous carbon, and catalytic metal, and (iv) purifying the intermediate carbon material by removing at least a portion of the amorphous carbon and optionally a portion of the catalytic metal. The purification step can also include removing oxygen containing functional groups generated during the removal of amorphous carbon or adding additional oxygen-containing functional groups to impart greater hydrophilicity to the carbon nanospheres.

(1) Forming a Precursor Mixture

The precursor mixture is formed by selecting a carbon precursor and dispersing a plurality of catalytic templating nanoparticles in the carbon precursor.

The catalytic templating nanoparticles, which are dispersed in the carbon precursor, can be provided in several different ways. The templating nanoparticles can be formed in the carbon precursor (i.e., in-situ) or formed in a separate reaction mixture and then mixed with the carbon precursor. In some cases, particle formation may partially occur in a separate reaction and then be completed as the templating particles are mixed and/or heated in the carbon precursor (e.g., at the onset of a precursor polymerization step). The templating nanoparticles can also be formed using a dispersing agent that controls one or more aspects of particle formation or the templating nanoparticles can be made from metal salts.

In one embodiment, the templating nanoparticles are formed in the carbon precursor from a metal salt. In this embodiment, the templating nanoparticles are formed by selecting one or more catalyst metal salts that can be mixed with the carbon precursor. The metal salts are mixed with the carbon precursor and then allowed or caused to form nanoparticles in-situ.

In a more preferred embodiment, the templating particles are formed (in-situ or ex-situ) using a dispersing agent to control particle formation. In this embodiment, one or more types of catalyst atoms and one or more types of dispersing agents are selected. Next, the catalyst atoms (e.g., in the form of a ground state metal or metal salt) and dispersing agent (e.g., in the form of a carboxylic acid or its salt) are reacted or combined together to form catalyst complexes. The catalyst complexes are generally formed by first dissolving the catalyst atoms and dispersing agent in an appropriate solvent and then allowing the catalyst atoms to bond with the dispersing agent molecules. The various components may be combined or mixed in any sequence or combination. In addition, a subset of the components can be premixed prior to addition of other components, or all components may be simultaneously combined.

In an embodiment of the invention, the components for the templating nanoparticles are allowed or caused to form nanoparticles by mixing the components for a period of about 1 hour to about 14 days. This mixing is typically conducted at temperatures ranging from about 0° C. to about 200° C. In one embodiment, the temperature does not exceed 100° C. Particle formation can also be induced using a reagent. For example, in some cases formation of particles or intermediate particles can be caused by bubbling hydrogen through the solution of catalyst complexes.

The templating nanoparticles of the present invention are capable of catalyzing polymerization and/or carbonization of the carbon precursor. The concentration of catalytic templating nanoparticles in the carbon precursor is typically selected to maximize the number of carbon nanostructures formed. The amount of catalytic templating particles can vary depending on the type of carbon precursor being used. In an example embodiment the molar ratio of carbon precursor to catalyst atoms is about 0.1:1 to about 100:1, more preferably about 1:1 to about 30:1.

(2) Polymerizing the Precursor Mixture

The precursor mixture is typically allowed to cure for sufficient time such that a plurality of intermediate carbon nanostructures are formed around the templating nanoparticles. Because the templating nanoparticles are catalytically active, the templating nanoparticles can preferentially accelerate and/or initiate polymerization of the carbon precursor near the surface of the templating particles.

The time needed to form intermediate nanostructures depends on the temperature, the type and concentration of the catalyst material, the pH of the solution, and the type of carbon precursor being used. During polymerization, the intermediate carbon nanostructures can be individual organic structures or an association of nanostructures that break apart during carbonization and/or removal of amorphous carbon.

Ammonia added to adjust the pH can also effect polymerization by increasing the rate of polymerization and by increasing the amount of cross linking that occurs between precursor molecules.

For hydrothermally polymerizable carbon precursors, polymerization typically occurs at elevated temperatures. In a preferred embodiment, the carbon precursor is heated to a temperature of about 0° C. to about 200° C., and more preferably between about 25° C. to about 120° C.

An example of a suitable condition for polymerization of resorcinol-formaldehyde gel (e.g., with iron particles and a solution pH of 1-14) is a solution temperature between about 0° C. and about 90° C. and a cure time of less than 1 hour to about 72 hours. Those skilled in the art can readily determine the conditions necessary to cure other carbon precursors under the same or different parameters.

In one embodiment the polymerization is not allowed to continue to completion. Terminating the curing process before the entire solution is polymerized can help to form a plurality of intermediate nanostructures that will result in individual nanostructures, rather than a single mass of carbonized material. However, the present invention includes embodiments where the carbon precursor forms a plurality of intermediate carbon nanostructures that are linked or partially linked to one another. In this embodiment, individual nanostructures are formed during carbonization and/or during the removal of amorphous carbon.

Forming intermediate carbon nanostructures from the dispersion of templating nanoparticles causes formation of a plurality of intermediate carbon nanostructures having unique shapes and sizes. Ultimately, the properties of the nanostructure can depend at least in part on the shape and size of the intermediate carbon nanostructure. Because of the unique shapes and sizes of the intermediate carbon nanostructures, the final nanostructures can have beneficial properties such as high surface area and high porosity, among others.

(3) Carbonizing the Precursor Mixture

The precursor mixture is carbonized by heating to form an intermediate carbon material that includes a plurality of carbon nanostructures, amorphous carbon, and catalyst metal. The precursor mixture can be carbonized by heating the mixture to a temperature between about 500° C. and about 2500° C. During the heating process, atoms such as oxygen and nitrogen are volatilized or otherwise removed from the intermediate nanostructures (or the carbon around the templating nanoparticles) and the carbon atoms are rearranged or coalesced to form a carbon-based structure.

The carbonizing step typically produces a graphite based nanostructure. The graphite based nanostructure has carbon atoms arranged in structured sheets of $sp^2$ hybridized carbon atoms. The graphitic layers can provide unique and beneficial properties, such as electrical conduction and structural strength and/or rigidity.

(4) Purifying the Intermediate Carbon Material

The intermediate carbon material is purified by removing at least a portion of non-graphitic amorphous carbon. This purification step increases the weight percent of carbon nanostructures in the intermediate carbon material.

The amorphous carbon is typically removed by oxidizing the carbon. The oxidizing agents used to remove the amorphous carbon are selective to oxidation of the bonds found in non-graphitic amorphous carbon but are less reactive to the pi bonds of the graphitic carbon nanostructures. The amorphous carbon can be removed by applying the oxidative agents or mixtures in one or more successive purification steps.

Optionally substantially all or a portion of the catalytic metals can be removed. Whether the catalytic metal is removed and the purity to which the catalytic metal is removed will depend on the desired amount of metal in the final product.

Typically, the templating nanoparticles are removed using acids or bases such as nitric acid, hydrogen fluoride, or sodium hydroxide. The method of removing the templating nanoparticles or amorphous carbon depends on the type of templating nanoparticle or catalyst atoms in the composite. Catalyst atoms or particles (e.g., iron particles or atoms) can typically be removed by refluxing the composite nanostructures in 5.0 M nitric acid solution for about 3-6 hours.

Any removal process can be used to remove the templating nanoparticles and/or amorphous carbon so long as the removal process does not completely destroy the carbon nanostructures. In some cases it may even be beneficial to at least partially remove some of the carbonaceous material from the intermediate nanostructure during the purification process.

During the purification process, the oxidizing agents and acids have a tendency to introduce hydronium groups and oxygenated groups such as, but not limited to, carboxylates, carbonyls, and/or ether groups to the surface of the carbonaceous materials. The oxidizing agents and conditions used to merely remove amorphous carbon typically introduce less than 9 wt % oxygen to the surface of the carbon nanostructures.

Optionally, the purification process can also include additional heat treatment steps at temperatures and conditions that can convert residual amorphous carbon to graphite. In this optional step, residual carbon is more easily converted to a graphitic material since a substantial portion of the amorphous carbon has been removed and there is better heat transfer to the portion that remains. If desired, oxygen-containing functional groups can be introduced to the surface of the carbon nanospheres by treating the intermediate carbon nanomaterial with a severe oxidizing agent. Generally, the duration of the oxidative treatment will depend on the amount of amorphous carbon in the intermediate material (i.e., whether a prior purification step has been performed and if so, how much residual amorphous carbon remains), the strength of the oxidizing agent, and the desired amount of functional groups to be introduced. Typically, the rate of functionalization increases with decreasing residual amorphous carbon and increases with increasing oxidizing potential of the oxidizing agent. In one embodiment, the oxidative treatment is carried out for a period of time in a range from about 2 hours to about 48 hours. To facilitate oxidation, the oxidative treatment can be carried out using sonication.

Carbon nanomaterials manufactured using the foregoing methods can be particularly advantageous for use in the present invention due to their controlled size and shape. However, those skilled in the art will recognize that the present invention can be carried out using carbon nanospheres manufactured using different methods than the foregoing.

V. EXAMPLES

The following examples provide formulas for making dispersed carbon nanomaterials containing carbon nanospheres according to the present invention.

Example 1

Example 1 describes the preparation of an intermediate carbon nanomaterial having carbon nanospheres that are agglomerated into clusters with an average particle size greater than 1 micron as measured using dynamic light scattering.

(a) Preparation of Iron solution (0.1 M)

A 0.1 M iron solution was prepared by using 84 g iron powder, 289 g of citric acid, and 15 L of water. The iron-containing mixture was mixed in a closed bottle on a shaker table for 3 days, with brief interruptions once or twice daily to purge the vapor space of the bottle with air gas before resuming mixing.

(b) Preparation of Precursor Mixture 916.6 g of resorcinol and 1350 g of formaldehyde (37% in water) were placed in a round bottom flask. The solution was stirred until resorcinol was fully dissolved. 15 L of the iron solution from step (a) was slowly added with stirring, and then 1025 ml of Ammonium hydroxide (28-30% in water) was added drop-wise with vigorous stirring, the pH of the resulted suspension was 10.26. The slurry was cured at 80~90° C. (water bath) for 10 hours. The solid carbon precursor mixture was the collected using filtration and dried in an oven overnight.

(c) Carbonization

The polymerized precursor mixture was placed in a crucible with a cover and transferred to a furnace. The carbonization process was carried out under ample nitrogen flow using the following temperature program: room temperature→1050° C. at a rate of 20° C./min→hold for 5 hrs at 1050° C.→room temperature. The carbonization step yielded an intermediate carbon material having carbon nanostructures, amorphous carbon, and iron.

(d) Purification To Remove Amorphous Carbon and Iron

The purification of the carbonized carbon product (i.e., the intermediate carbon material) was performed as follows: reflux carbonized product in 5M $HNO_3$ for ~12 hrs→rinse with de-ionized (DI)-$H_2O$→treat with a mixture of $KMnO_4$+$H_2SO_4$+$H_2O$ at a mole ratio of 1:0.01:0.003 (keep at ~90° C. for ~12 hrs)→rinse with DI-$H_2O$→treat with 4M HCl (keep at ~90° C. for ~12 hrs)→rinse with Di-H$_2$O→collect the product and dry in the oven at ~100° C. for two days.

Example 2

Example 2 describes a method for preparing dispersed carbon nanospheres using glucose, water and ultrasonication.

100 ml of Glucose in water at a concentration of 6 wt % was added to 3.0 g of carbon nanomaterial (greater than 98% carbon nanospheres) in a glass container. The solution was then mixed using ultrasound treatment for 2 hours. Ultrasonication to effect dispersion of nanospheres was performed using CREST ULTRASONICS TRU-SWEEP™ (68 kHz frequencies and 500 watt). The solution turned black indicating the dispersion of the carbon nanospheres in the water. The 2.3 wt % dispersed carbon nanospheres continued to remain stably dispersed in the water after three months.

FIGS. 4A and 4B, are SEM and TEM images, respectively of the carbon nanospheres manufactured according to Example 2. As discussed above, The SEM and TEM images show a dramatic improvement in dispersion as compared to the undispersed carbon nanomaterial, which are shown in FIGS. 2A-2C.

FIG. 3 provides a graph of the dynamic light scattering of the dispersed carbon nanospheres of Example 2. The light scattering data was collected using a MALVERN ZetaSizer (Nano Series). The sample was assayed using a quartz cuvette with an acquisition time of 360 s. As shown in the graph, the dispersed carbon nanospheres of Example 2 had an average particle size of 147 nm. In contrast, the carbon nanospheres prior to dispersion had an average particle size of 1.4 microns as shown in FIG. 1.

Figure 5:
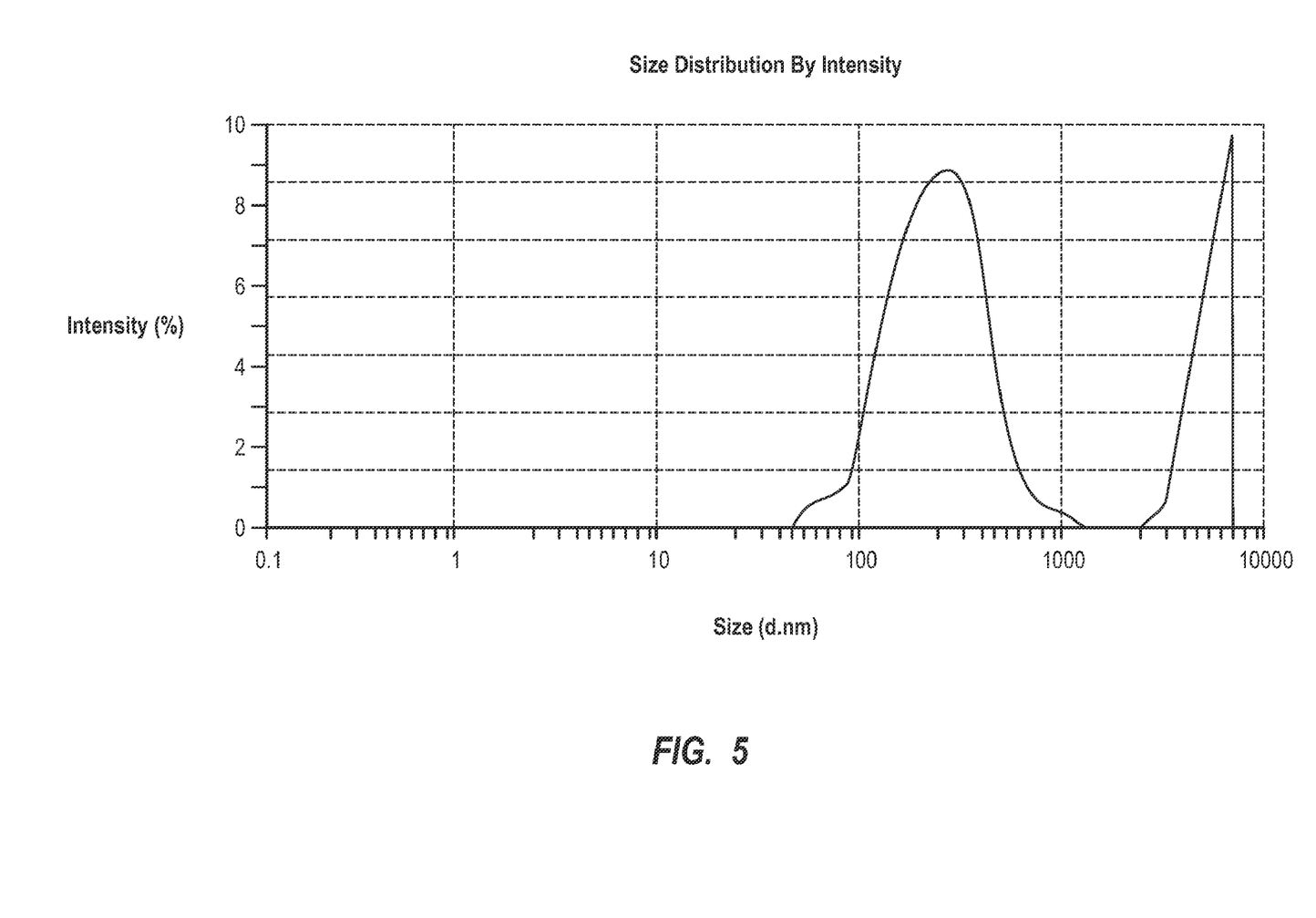
FIG. 5 is a comparative dynamic light scattering spectrum of carbon nanospheres ultrasonicated in plain water for 2 hours.

FIG. 5 shows the carbon nanospheres sonicated in water only. Surprisingly, the particle size distribution after sonication for 2 hours in water only shows a peak at 5 microns and another peak at 254 microns. This result is surprising because the results without sonication did not show a peak at 5 microns. Thus, it appears that in some cases, such as with pure water, sonication may result in both particle size reduction and agglomeration. In contrast, sonication with water and a surface modifying agent according to the invention produces significantly smaller particle sizes but not the larger agglomerates at 5 microns.

Example 3

Example 3 describes a method for preparing dispersed carbon nanospheres using glycine and water.

100 ml of Glycine in water at a concentration of 6 wt % was added to 3.0 g of carbon nanomaterial (greater than 98% carbon nanospheres) in a glass container. The solution was then mixed using ultrasound treatment for 2 hours. Ultrasonication to effect dispersion of nanospheres was performed using CREST ULTRASONICS TRU-SWEEP™ (68 kHz frequencies and 500 watt). The solution turned black indicating the dispersion of the carbon nanospheres in the water. The average particle size as measured using dynamic light scattering was 168 nm. The 1.8 wt % dispersed carbon nanospheres continued to remain stably dispersed in the water after three months.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for manufacturing a carbon nanomaterial dispersion, comprising,
   (i) providing a carbon nanomaterial comprising a plurality of multi-walled, graphitic carbon nanospheres that have been separated from amorphous carbon, wherein the plurality of carbon nanospheres are at least partially agglomerated into a plurality of clusters of carbon nanospheres;
   (ii) forming a solution comprised of a polar solvent and an organic surface modifying agent, wherein the surface modifying agent is selected from the group consisting of glucose, glycolic acid, glycine, ascorbic acid, sodium dodecyl benzene sulfonate, and combinations thereof;
   (iii) mixing the carbon nanomaterial with the solution; and
   (iv) ultrasonicating the solution containing the polar solvent, organic surface modifying agent, and carbon nanomaterial to at least partially disrupt the clusters of carbon nanospheres to yield carbon nanospheres suspended in the solution.

2. A method as in claim 1, wherein the carbon nanomaterial in step (i) has an average particle size greater than about 500 nm as measured using dynamic light scattering.

3. A method as in claim 1, wherein the carbon nanomaterial in step (iv) has an average particle size less than about 500 nm as measured using dynamic light scattering.

4. A method as in claim 1, wherein the carbon nanomaterial in step (iv) has an average particle size less than about 300 nm as measured using dynamic light scattering.

5. A method as in claim 1, wherein the carbon nanomaterial in step (iv) has an average particle size less than about 200 nm as measured using dynamic light scattering.

6. A method as in claim 1, wherein the polar solvent comprises water, an alcohol, THF, or a combination thereof.

7. A method as in claim 1, wherein the surface modifying agent is selected from the group consisting of a surfactant, an organic acid, a carbohydrate, an amino acid, and combinations thereof.

8. A method as in claim 1, wherein the surface modifying agent is biocompatible.

9. A method as in claim 1, wherein the surface of the carbon nanomaterial has at least about 2 wt % oxygen as measured using X-ray photoelectron spectroscopy (XPS).

10. A method as in claim 1, wherein the carbon nanospheres are ultrasonicated for at least about 30 minutes.

11. A method as in claim 1, wherein the carbon nanospheres are manufactured by:
   forming a precursor mixture comprising a carbon precursor and a plurality of templating nanoparticles and polymerizing the carbon precursor, the templating nanoparticles comprising a catalytic metal;
   carbonizing the precursor mixture to form an intermediate carbon material comprising a plurality of carbon nanostructures, amorphous carbon, and optionally remaining catalytic metal; and
   purifying the intermediate carbon material by removing at least a portion of the amorphous carbon and optionally a portion of any remaining catalytic metal, thereby yielding the carbon nanomaterial comprising a plurality of carbon nanostructures provided in step (i).

12. A method as in claim 11, in which the templating nanoparticles are prepared by,
   (a) reacting a plurality of precursor catalyst atoms with a plurality of organic dispersing agent molecules to form complexed catalyst atoms; and (b) allowing or causing the complexed catalyst atoms to form the templating nanoparticles.

13. A method for manufacturing a carbon nanomaterial dispersion, comprising:
   (i) providing an agglomerated carbon nanomaterial comprising a plurality of multi-walled, graphitic carbon nanospheres that have been separated from amorphous carbon, the carbon nanospheres having an average diameter in a range from about 10 nm to about 200 nm and having an irregular surface;
   (ii) forming a solution comprised of a polar solvent and an organic surface modifying agent, wherein the surface modifying agent is selected from the group consisting of glucose, glycolic acid, glycine, ascorbic acid, sodium dodecyl benzene sulfonate, and combinations thereof;
   (iii) mixing the carbon nanomaterial with the solution; and
   (iv) sonicating the solution containing the polar solvent, organic surface modifying agent, and carbon nanomaterial to cause at least a portion of the surface modifying agent molecules to bond to the carbon nanospheres and suspend the carbon nanospheres in the solution.

14. A method as in claim 13, wherein the carbon nanomaterial provided in step (i) has an average particle size in a range from about 500 nm to about 5 microns as measured using dynamic light scattering and wherein the carbon nanomaterial in step (iv) has an average particle size less than about 300 nm as measured using dynamic light scattering.

15. A method as in claim 13, wherein the carbon nanomaterial provided in step (i) has an average particle size in a range from about 500 nm to about 5 microns as measured using dynamic light scattering and wherein the carbon nanomaterial in step (iv) has an average particle size less than about 200 nm as measured using dynamic light scattering.

16. A method as in claim 13, wherein the polar solvent comprises water.

17. A method as in claim 13, wherein the surface modifying agent comprises one or more functional groups selected from the group consisting of carboxyl, amine, sulfonate, and hydroxyl.

18. A method as in claim 13, the method yielding a carbon nanomaterial dispersion comprising:
   the polar solvent; and
   the carbon nanospheres suspended in the polar solvent, wherein the carbon nanospheres have an asapect ratio less than about 3:1 and a plurality of surface modifying agent molecules bonded to the surface thereof.

19. A method as in claim 1, wherein the polar solvent comprises water.

* * * * *

UNITED STATES PATENT AND TRADEMARK OFFICE
CERTIFICATE OF CORRECTION

PATENT NO.       : 7,666,915 B2
APPLICATION NO.  : 11/860373
DATED            : February 23, 2010
INVENTOR(S)      : Zhang et al.

It is certified that error appears in the above-identified patent and that said Letters Patent is hereby corrected as shown below:

Title Page, item 56 Left Column
Other Publications, change "Sun et al., "Colloidal Carbon Spheres and Their Core/Shell tructures with Noble-Metal Nanoparticles", Angewandte Chemie International Edition, Wiley-VCH Verlag GmbH & Co. KGaA, 2004, vol. 43 Issue 5, pp. 597-601.*" to --Sun et al., "Colloidal Carbon Spheres and Their Core/Shell Structures with Noble-Metal Nanoparticles", Angewandte Chemie International Edition, Wiley-VCH Verlag GmbH & Co. KGaA, 2004, vol. 43, Issue 5, pp. 597-601.*--

Title Page, item 56 Right Column
Other Publications, change "Garrigue, P., et al., "Top-Down Approach for the Preparation of Collodial Carbon nanoparticles", *Chem. Mater.*, vol. 16, No. 16, pp. 2984-2986 (2004)." to --Garrigue, P., et al., "Top-Down Approach for the Preparation of Colloidal Carbon nanoparticles", *Chem. Mater.*, vol. 16, No. 16, pp. 2984-2986 (2004).--

Column 2
Line 10, change "most" to --most preferably--

Column 6
Line 57, change "watt" to --watts--

Column 7
Line 5, change "mm" to --nm--
Line 22, change "Figures" to --figures--

Column 14
Line 50, change "the" to --then--

Column 15
Line 14, change "watt" to --watts--
Line 22, change "are" to --is--
Line 56, change "watt" to --watts--

Signed and Sealed this

Twenty-second Day of June, 2010

David J. Kappos
*Director of the United States Patent and Trademark Office*